United States Patent
Lee et al.

(10) Patent No.: US 9,692,075 B1
(45) Date of Patent: Jun. 27, 2017

(54) MULTI-LAYERED PROTON-CONDUCTING ELECTROLYTE

(71) Applicant: UCHICAGO ARGONNE, LLC, Chicago, IL (US)

(72) Inventors: Tae H. Lee, Naperville, IL (US); Stephen E. Dorris, LaGrange Park, IL (US); Uthamalingam Balachandran, Willowbrook, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 33 days.

(21) Appl. No.: 15/006,661

(22) Filed: Jan. 26, 2016

(51) Int. Cl.
| | |
|---|---|
| H01M 8/12 | (2016.01) |
| H01M 8/1226 | (2016.01) |
| H01M 4/86 | (2006.01) |
| H01M 8/1007 | (2016.01) |
| H01M 8/124 | (2016.01) |
| H01M 8/1253 | (2016.01) |
| H01M 8/126 | (2016.01) |

(52) U.S. Cl.
CPC ....... *H01M 8/1226* (2013.01); *H01M 4/8621* (2013.01); *H01M 8/1007* (2016.02); *H01M 8/126* (2013.01); *H01M 8/1253* (2013.01); *H01M 2008/1293* (2013.01); *H01M 2300/0074* (2013.01); *H01M 2300/0077* (2013.01); *H01M 2300/0094* (2013.01)

(58) Field of Classification Search
CPC ............. H01M 8/1226; H01M 4/8621; H01M 8/1007; H01M 2008/1293; H01M 2300/0074; H01M 8/126; H01M 2300/0094; H01M 2300/0077; H01M 8/1253

See application file for complete search history.

(56) References Cited

U.S. PATENT DOCUMENTS

2015/0044597 A1 2/2015 Hiraiwa et al.

FOREIGN PATENT DOCUMENTS

EP 2886678 A1 6/2015

OTHER PUBLICATIONS

Sawant et. al., Synthesis, stability and conductivity of BaCe0.8-xZrxY0.2O3-d, as electrolyte for proton conducting SOFC, International Journal of Hydrogen Energy 37 (2012) 3848-3856.*

(Continued)

*Primary Examiner* — Cynthia K Walls
(74) *Attorney, Agent, or Firm* — Olson & Cepuritis, Ltd.

(57) ABSTRACT

The present invention provides a multilayer anode/electrolyte assembly comprising a porous anode substrate and a layered solid electrolyte in contact therewith. The layered solid electrolyte includes a first dense layer of yttrium-doped barium zirconate (BZY), optionally including another metal besides Y, Ba, and Zr (e.g., a lanthanide metal such as Pr) on one surface thereof, a second dense layer of yttrium-doped barium cerate (BCY), and an interfacial layer between and contacting the BZY and BCY layers. The interfacial layer comprises a solid solution of the BZY and BCY electrolytes. The porous anode substrate comprises at least one porous ceramic material that is stable to carbon dioxide and water (e.g., porous BZY), as well as an electrically conductive metal and/or metal oxide (e.g., Ni, NiO, and the like).

20 Claims, 10 Drawing Sheets

(56) References Cited

OTHER PUBLICATIONS

Fabbri et. al., Design and fabrication of a chemically-stable proton conductor bilayer electrolyte for intermediate temperature solid oxide fuel cell (IT-SOFCs), Energy and Environmental Science, 2008, 1, 355, 359.*
Qian et. al., Fabrication and performance of BaCe0.8Y0.2O3-d-BaZr0.8Y0.2O3-d bilayer electrolyte for anode-supported solid oxide fuel cells, Journal of Power Sources, 249 (2014) 131-136.*
Lei, B. et al., Sinteractive Anodic Powders Improve Densification and Electrochemical Properties of BaZr0.8Y0.2O3-σ Electrolyte Films for Anode-Supported Solid Oxide Fuel Cells, Energy Environ. Sci., 4, 1352-1357 (20110).
Faes, A. et al., A Review of RedOx Cycling of Solid Oxide Fuel Cells Anode, Membranes 2, 585-664 (2012).
Lee, S-S et al., Life Cycle Assessment for Proton Conducting Ceramics Synthesized by the Sol-Gel Process, Materials 7, 6677-6685 (2014).
Park, H.J. et al., Grain Boundary Protonic Conductivity in Highly Dense Nano-crystalline Y-doped BaZrO3, Journal of the Korean Ceramic Society 47, (1), 71-74 (2010).
Duval, S., Y-Substituted Barium Zirconate, a Proton Conducting Electrolyte for Applications at Intermediate Temperatures, Thesis Paper, (2004-2007).

* cited by examiner

MULTI-LAYERED PROTON-CONDUCTING ELECTROLYTE

STATEMENT OF GOVERNMENT INTEREST

The United States Government has rights in this invention pursuant to Contract No. DE-AC02-06CH11357 between the United States Government and UChicago Argonne, LLC representing Argonne National Laboratory.

FIELD OF THE INVENTION

This invention relates to proton-conducting composite electrolytes. More particularly, the invention relates proton-conducting composite electrolytes comprising layered metal oxide films, suitable for use, e.g., in intermediate temperature fuel cells.

BACKGROUND OF THE INVENTION

Oxide proton conductors are of great interest for their application in solid oxide fuel cells. Yttrium-doped barium zirconate (BZY) has high grain (bulk) proton conductivity at intermediate temperatures (e.g., 400-600° C.), and it has good chemical stability toward moisture and carbon dioxide. However, it is difficult to sinter BZY to high densities, and it has high grain boundary resistivity. BZY requires very high sintering temperature ($\geq 1600°$ C.) to obtain high density (i.e., a low-porosity or nonporous film). The use of high sintering temperatures can increase density and enhance grain growth, which reduces the number of grain boundaries and increases the grain boundary conductivity, thereby increasing the total conductivity of BZY. High sintering temperatures, however, can promote deleterious chemical reactions between BZY and its electrodes. It can also accelerate the evaporation of barium oxide, which degrades the electrolyte's conductivity.

Yttrium-doped barium cerate (BCY) has the highest total conductivity among the reported perovskite oxides and has good sinterability (i.e., it can be sintered at relatively low temperatures$\leq 1400°$ C.). In spite of its favorable transport properties, BCY has poor chemical stability toward $CO_2$ and water, which are present in fuel cell anode gas. There is an ongoing need for proton-conducting ceramic electrolytes and anodes for fuel cell applications, which have favorable transport and chemical stability properties. The solid electrolytes and electrodes described herein address this need.

SUMMARY OF THE INVENTION

Multi-layered dense composite electrolyte films for use in conjunction with intermediate temperature fuel cells are described herein. The electrolyte films combine BZY's high proton conductivity and good chemical stability with BCY's favorable transport properties and good sinterability. The composite electrolyte film comprises a layer of dense (i.e., substantially nonporous) BZY, optionally including one of more another metal besides Y, Ba, and Zr (e.g., a lanthanide metal such as Pr), and a layer of dense BCY, with an interfacial layer in between. The interfacial layer is a solid solution of the BZY and BCY electrolytes, also referred to herein as "BZCY". The solid solution is formed from the reaction of the BZY and BCY layers during sintering of the composite to convert green (i.e., unsintered) BZY and BCY precursors into dense BZY and BCY layers. The electrolyte film is supported on a porous anode substrate forming a layered assembly, such that the BZY layer contacts the anode substrate and the BCY layer is separated from the substrate by the intervening BZY layer and BZPY interfacial layer.

The anode substrate comprises a porous ceramic material that is stable to the fuel source, carbon dioxide, and water under the fuel cell operating conditions (e.g., BZY), and which includes an electrically conductive metal, metal oxide and/or a combination of metal and metal oxide (e.g., Ni, NiO, etc.) dispersed within the porous ceramic material.

For convenience, the term "BZY" as used herein refers to yttrium-doped barium zirconate, as well as yttrium-doped barium zirconate that also includes one or more additional metal, such as praseodymium-containing BZY, also referred to as BZPY. The term "dense" as used herein in reference to a metal oxide film or layer, means that the film or layer is substantially nonporous, and is not meant to refer to a specific mass density, as is well known to those of ordinary skill in the solid oxide fuel cell art.

For fuel cell operation, the chemically stable BZY layer is located at the anode (fuel) side of the fuel cell, in contact with the porous anode substrate, where $CO_2$ (e.g., generated from a hydrocarbon fuel) and $H_2O$ typically are present during fuel cell operation. Consequently, the BCY side of the electrolyte is located at the cathode (air) side of the fuel cell. The BZY layer acts as a barrier to protect the BCY layer from detrimental contact with $CO_2$ and $H_2O$, and the BCY layer enhances the conductivity of the electrolyte relative to, e.g., BZY. Thus, the multilayer design described herein ameliorates the chemical instability associated with BCY when in contact with carbon dioxide and water (due to the dense BZY barrier layer), while taking advantage of the favorable transport properties of BCY.

The following selected, non-limiting embodiments are provided to illustrate certain aspects and features of the solid electrolyte film materials described herein.

Embodiment 1 comprises a multilayer fuel cell anode/electrolyte assembly comprising a porous ceramic anode substrate comprising an electrically conductive metal and/or metal oxide dispersed in a porous ceramic matrix; and a layered solid electrolyte in contact with the anode substrate. The layered solid electrolyte comprises (a) a first dense layer having an inner surface and an outer surface, the first dense layer comprising yttrium-doped barium zirconate (BZY), and optionally another metal ion besides barium, zirconium, and yttrium, wherein the inner surface of the first dense layer is in contact with a surface of the anode substrate; (b) a second dense layer comprising yttrium-doped barium cerate (BCY); and (c) an interfacial layer between and in contact with the outer surface of the first dense layer and a surface of the second dense layer. The interfacial layer comprises a solid solution of the BZY and the BCY. The metal and/or metal oxide of the anode facilitates electrical conduction in the anode and in some cases can act as a catalyst for redox reactions of a fuel such as hydrogen and/or a hydrocarbon during operation of a fuel cell comprising the anode/electrolyte assembly. The first dense layer and the interfacial layer prevent contact between the second dense layer and the porous substrate.

Embodiment 2 comprises the multilayer fuel cell anode/electrolyte assembly of Embodiment 1, wherein the first dense layer comprises a praseodymium-containing yttrium-doped barium zirconate (BZPY).

Embodiment 3 comprises the multilayer fuel cell anode/electrolyte assembly of any one of Embodiments 1 or 2, wherein the anode comprises Ni, NiO, or a combination thereof, dispersed in a porous ceramic matrix.

Embodiment 4 comprises the multilayer fuel cell anode/electrolyte assembly of any one of Embodiments 1 to 3, wherein the anode comprises a porous NiO-BZY ceramic material.

Embodiment 5 comprises the multilayer fuel cell anode/electrolyte assembly of any one of Embodiments 1 to 4, wherein the first dense layer has a thickness in the range of about 0.1 micrometers ("μm") to about 20 μm.

Embodiment 6 comprises the multilayer fuel cell anode/electrolyte assembly of any one of Embodiments 1 to 5, wherein the second dense layer has a thickness in the range of about 0.1 μm to about 20 μm.

Embodiment 7 comprises the multilayer fuel cell anode/electrolyte assembly of any one of Embodiments 1 to 6, wherein the porous substrate has an average pore size in the range of about 0.2 μm to about 5 μm, as determined by scanning electron microscopy ("SEM").

Embodiment 8 comprises the multilayer fuel cell anode/electrolyte assembly of any one of Embodiments 1 to 7, wherein the porous substrate has a porosity in the range of about 10% to about 40%, as determined by SEM.

Embodiment 9 comprises a multilayer fuel cell electrolyte/anode assembly comprising a porous NiO-BZY anode substrate; and a layered solid electrolyte comprising: (a) a first dense layer having an inner surface and an outer surface, the first dense layer comprising yttrium-doped barium zirconate (BZY), wherein the inner surface of the first dense layer is in contact with a surface of the substrate; (b) a second dense layer comprising yttrium-doped barium cerate (BCY); and (c) an interfacial layer between and in contact with the outer surface of the first dense layer and a surface of the second dense layer, the interfacial layer comprising a solid solution of the BZY of the first dense layer and the BCY; wherein the first dense layer and the interfacial layer prevent direct contact between the second dense layer and the porous anode substrate.

Embodiment 10 comprises the multilayer fuel cell anode/electrolyte assembly of Embodiment 9, wherein the first dense layer, second dense layer, and interfacial layer together have a combined thickness in the range of about 0.2 μm to about 40 μm.

Embodiment 11 comprises the multilayer fuel cell anode/electrolyte assembly of any one of Embodiments 9 or 10, wherein the first dense layer has a thickness in the range of about 0.1 μm to about 20 μm.

Embodiment 12 comprises the multilayer fuel cell anode/electrolyte assembly of any one of Embodiments 9 to 11, wherein the second dense layer has a thickness in the range of about 0.1 μm to about 20 μm.

Embodiment 13 comprises the multilayer fuel cell anode/electrolyte assembly of any one of Embodiments 9 to 12, wherein the porous anode substrate has an average pore size in the range of about 0.2 μm to about 5 μm and a porosity in the range of about 10% to about 40%, as determined by SEM.

Embodiment 14 comprises a multilayer fuel cell electrolyte/anode assembly comprising a porous NiO-BZY anode substrate; and a layered solid electrolyte comprising: (a) a first dense layer having an inner surface and an outer surface, the first dense layer comprising praseodymium-containing yttrium-doped barium zirconate (BZPY), wherein the inner surface of the first dense layer is in contact with a surface of the substrate; (b) a second dense layer comprising yttrium-doped barium cerate (BCY); and (c) an interfacial layer between and in contact with the outer surface of the first dense layer and a surface of the second dense layer, the interfacial layer comprising a solid solution of the BZPY of the first dense layer and the BCY; wherein the first dense layer and the interfacial layer prevent direct contact between the second dense layer and the porous anode substrate.

Embodiment 15 comprises the multilayer fuel cell anode/electrolyte assembly of Embodiment 14, wherein the first dense layer, second dense layer, and interfacial layer together have a combined thickness in the range of about 0.2 μm to about 40 μm.

Embodiment 16 comprises the multilayer fuel cell anode/electrolyte assembly of any one of Embodiments 14 or 15, wherein the first dense layer has a thickness in the range of about 0.1 μm to about 20 μm.

Embodiment 17 comprises the multilayer fuel cell anode/electrolyte assembly of any one of Embodiments 14 to 16, wherein the second dense layer has a thickness in the range of about 0.1 μm to about 20 μm.

Embodiment 18 comprises the multilayer fuel cell anode/electrolyte assembly of any one of Embodiments 14 to 17, wherein the porous anode substrate has an average pore size in the range of about 0.2 μm to about 5 μm and a porosity in the range of about 10% to about 40%, as determined by SEM.

Embodiment 19 comprises a fuel cell comprising a porous cathode and an anode/electrolyte assembly of Embodiment 1, in which a gaseous fuel comprising a hydrogen, a hydrocarbon (e.g., methane, ethane, propane, etc.) or a combination thereof contacts the porous anode of the assembly, an oxygen gas source (e.g., air) contacts the cathode, and the fuel cell is maintained at a temperature in the range of about 400 to 600° C. during the operation thereof.

Embodiment 20 comprises the solid oxide fuel cell of Embodiment 19, wherein a majority of the fuel is hydrogen or methane.

BRIEF DESCRIPTION OF THE DRAWINGS

in FIG. 2).

DETAILED DESCRIPTION OF PREFERRED EMBODIMENTS

An exemplary multilayer, porous anode/electrolyte assembly of the present invention comprises a porous ceramic anode substrate and a layered solid electrolyte contacting the anode substrate. The layered electrolyte comprises a first dense layer having an inner surface and an outer surface, the first dense layer comprising yttrium-doped barium zirconate (BZY), and optionally another metal ion besides barium, zirconium, and yttrium, and a second dense layer comprising yttrium-doped barium cerate (BCY), with an interfacial layer between the two dense layers. The interfacial layer comprises a solid solution of the BZY and the BCY (also referred to herein as "BCZY"). The porous anode substrate comprises an electrically conductive metal, a metal oxide, or combination thereof, dispersed in a porous ceramic matrix. One surface of the BZY layer (first dense layer) is in contact with a surface of the anode substrate and acts as a barrier to prevent contact of the BCY layer (second dense layer) with water and carbon dioxide, which at typical intermediate temperature fuel cell operating temperatures (400 to 600° C.) will decompose BCY. Thus, the anode/electrolyte assemblies described herein take advantage of the favorable proton transport properties of BCY, while avoiding the chemical instability BCY. The metal or metal oxide of the porous substrate provides electronic conductivity and in some embodiments can act as a catalyst for redox reactions occurring at the anode.

The porous anode substrate comprises at least one porous proton-conductive ceramic material that is stable to carbon dioxide and water, such as BZY, yttrium-doped strontium zirconate (SZY), and the like, as well as a conductive material such as a metal and/or metal oxide (e.g., a main group metal, a transition metal, a lanthanide metal, a rare earth metal, an alkaline earth metal, and/or an oxide of any of the foregoing metals). In some embodiments, the conductive material includes Ni, NiO, or a combination thereof. Besides providing electrical conductivity in the anode, the metal and/or metal oxide can in some cases catalyze redox reactions of the fuel during operation of a fuel cell comprising the anode/electrolyte assembly. For example, Ni and/or NiO can catalyze conversion of hydrogen and/or a hydrocarbon fuel such as methane, ethane, propane, and the like.

As non-limiting examples, the porous anode substrate can comprise a porous Ni-BZY cermet substrate, a porous Ni-SZY cermet substrate, a porous Ni-BZY-SZY cermet substrate, a porous NiO-BZY substrate, a porous NiO-SZY substrate, and the like. Optionally, the metal or metal oxide of the substrate can perform other functions, such as e.g., to inhibit Ni particle growth, to passivate the Ni surface, or to provide other beneficial properties. Non-limiting examples of metals and metal oxide materials that can be included in the anode include such as nickel, copper, tungsten, bismuth, aluminum, titanium, chromium, scandium, vanadium, tantalum, manganese, lanthanum, niobium, etc., and oxides thereof. In some embodiments, one metal or metal oxide can provide electrical conductivity, while a different metal or metal oxide may provide catalytic activity. The anode should have some degree of proton conductivity (e.g., provided by the ceramic matrix) and some electrical (electron) conductivity (e.g., provided by the metal or metal oxide component).

The porous substrate typically has a thickness in the range of about 50 μm to about 2 millimeters (e.g., about 1 millimeter). In some embodiments the porous substrate has an average pore size in the range of about 0.2 μm to about 5 μm as determined by SEM, and a porosity in the range of about 10% to about 40%, also as determined by SEM.

In some embodiments, the BCY layer has a thickness in the range of about 0.1 to about 20 μm (e.g., about 4 μm to about 6 μm), and the BZY layer has a thickness in the range of about 0.1 to about 20 μm (e.g., about 4 μm to about 6 μm). The interfacial layer is a solid solution formed at the interface between the BZY and BCY layers during sintering.

The dense multi-layered films of BCY/BZY and BCY/BZPY can be fabricated at much lower sintering temperature (e.g., ≤1400° C.) than dense BZY alone. The multi-layered electrolyte design described herein provides the high proton conductivity of BCY as well as high chemical stability of BZY for fuel cell electrolyte applications, and is suitable for practical intermediate temperature solid oxide fuel cells to produce stable and high power density.

Figure 1A:
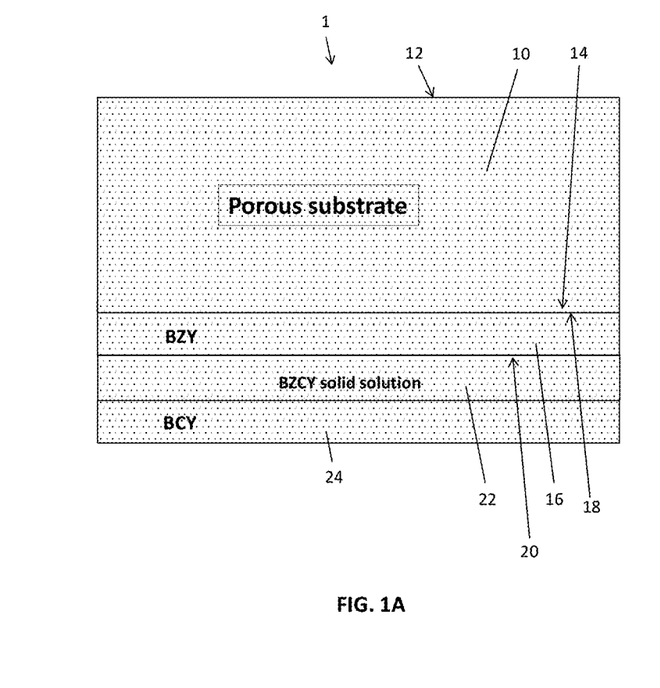
FIG. 1A schematically illustrates a porous fuel cell anode/electrolyte assembly as described herein.

FIG. 1A schematically illustrates one embodiment of an anode/electrolyte assembly of the present invention. Fuel cell anode/electrolyte assembly 1 comprises a porous ceramic anode 10, which comprises a metal, metal oxide, or combination thereof, dispersed in a porous, proton-conductive ceramic matrix. Anode 10 contacts a layered solid electrolyte comprising a first dense layer 16, having an inner surface 18 and an outer surface 20. First dense layer 16 comprises yttrium-doped barium zirconate (BZY) and optionally another metal ion besides barium, zirconium, and yttrium. Inner surface 18 is in contact with a surface 14 of anode 10. A second dense layer 24 comprises yttrium-doped barium cerate (BCY). An interfacial layer 22 is situated between first dense layer 16 and second dense layer 24. Interfacial layer 22 comprises a solid solution of the BZY and the BCY situated between first dense layer 16 and second dense layer 24, with interfacial layer 22 contacting outer surface 20 of first dense layer 16. First dense layer 16 and interfacial layer 22 prevent direct contact between the BCY of second dense layer 24 and porous anode 10.

Figure 1B:
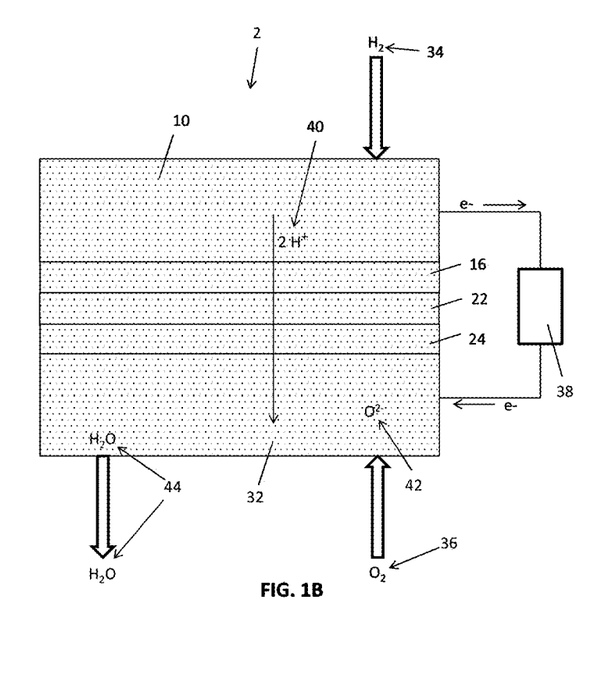
FIG. 1B schematically illustrates a fuel cell comprising the anode/electrolyte assembly of FIG. 1A and a porous cathode.

When the anode/electrolyte assembly is used in a solid oxide fuel cell, first dense layer 16 and interfacial layer 22 act as a barrier to prevent the BCY of second dense layer 24 from coming into contact with carbon dioxide and water generated during operation of the fuel cell. FIG. 1B schematically illustrates the assembly of FIG. 1A incorporated in a fuel cell 2. Porous cathode 32 contacts second dense layer 24 of the electrolyte. Hydrogen fuel 34 is supplied into porous anode 10, and oxygen 36 (e.g., from air) is supplied into porous cathode 32. Optionally, the hydrogen can be replaced or supplemented with a hydrocarbon fuel (e.g., methane). Fuel cell 2 is maintained at a temperature in the range of about 400 to about 600° C. When a load 38 is placed on the cell, protons 40 are generated within porous anode 10, a current (e-) flows from anode 10 through load 38 to cathode 32, and oxygen anions 42 are generated within cathode 32. Protons 40 migrate through electrolyte layers 16, 22, and 24 into cathode 32, where the protons 40 combine with oxygen anions 42 to form water 44.

BZY, BCY, and BZPY, as well as other related barium zirconates and barium cerates, can be prepared by combustion synthesis techniques that are well known to those of ordinary skill in the solid oxide fuel cell art. Combustion synthesis techniques, such as the so-called glycine-nitrate process, produce submicron-size, homogeneous particles of mixed oxides that promote densification without the need to sinter at high temperatures or to use sintering aids. In combustion synthesis, the appropriate amounts of nitrate salts of the constituent metal cations (based on the target metal cation ratios in the material) are dissolved in water along with a fuel source such as glycine, hydrazine, or citric acid. The solution is heated to evaporate the water, and subsequently, the nitrates react with the fuel source, resulting in rapid combustion, which yields the targeted oxide (typically within minutes). Because the reaction is so fast and evolves a large volume of gaseous byproducts, particle growth has little time to occur and is disrupted by the evolution of gas. Consequently, the mixed oxide product is a fine-grained powder that is easily sintered at moderate sintering temperatures (e.g., 900 to 1300° C.). The phase purity of the metal oxide powder can be checked by x-ray diffraction methods.

A porous ceramic anode substrate, such as a BZY or NiO/BZY substrate can be prepared from a powder mixture of the desired metal oxide or metal oxides and a powdered carbon material such as lampblack, as is well known to those of ordinary skill in the solid oxide fuel cell art. Optionally a binder can be added to the mixture, as well. For example, inorganic binders (e.g., sodium silicate, magnesium aluminum silicate, bentonite, and the like), organic binders (e.g., polyvinyl alcohol, starches, carboxymethylcellulose, dextrin, wax emulsions, polyethylene glycols, lignosulfonates, methylcellulose, paraffins, polyacrylates (e.g., sodium and ammonium salts of polyacrylate acid and polyacrylate esters), and the like), or a combination of inorganic and organic binders can be used. The mixture is ball-milled in a volatile liquid such as isopropyl alcohol using a ball-milling medium such as zirconia medium for a period of time sufficient to achieve the desired particles size. After milling, the liquid is then removed by evaporation, filtration, or a combination thereof. The resulting dried powder is then pressed into a suitable anode form, such as a disk and is then partially sintered in air at a temperature appropriate to the particular target ceramic (e.g., 900 to 1300° C.). Combustion of the carbon in the mixture results in a porous product. For example, to prepare a porous NiO/BZY substrate, a powder mixture of BZY, NiO, carbon lampblack, and a binder, such as polyvinyl alcohol (PVA) or methylcellulose, is ball-milled in isopropyl alcohol using zirconia media (e.g., 5 mm to 20 mm diameter zirconia particles) for about 10 to 24 hours. After milling, the isopropyl alcohol is evaporated, and then the dried powder is sieved to a desired particle size. The sieved powder is then uniaxially pressed into a disk or other form, and is partially sintered for about 5 hours at about 900 to about 1225° C. in air.

The dense, thin film electrolyte layers can be fabricated using a colloidal coating process. The colloidal coating process utilizes a colloid of the metal oxide (e.g., BZY, BZPY, or BCY) which is prepared by dispersing the metal oxide powder in a liquid such as isopropanol, at a solids concentration of about 10 to 40 g/L. To fabricate a layered BCY-BZY film, a BZY film is first deposited from a BZY colloid onto the partially-sintered porous substrate by dipping the substrate into a BZY colloid or using another appropriate coating method (e.g., draw coating), and then removing the liquid, e.g., by evaporation, leaving a thin film of the metal oxide on the substrate. The depositing and drying can be repeated as many times as necessary to achieve a target layer thickness (e.g., about 0.1 to about 20 μm). The BZY coated substrate is then coated with BCY in the same manner, and then the multilayered BZY/BCY coated substrate is sintered (e.g., at about 1350 to about 1485° C.) using heating and cooling rates of, e.g., 180° C./hour.

Example 1. BZPY Synthesis

Powders of $BaZr_{0.8}Y_{0.2}O_x$ (BZY) and $BaCe_{0.8}Y_{0.2}O_x$ (BCY) were purchased from Praxair Specialty Ceramics. A powder of $BaZr_{0.7}Pr_{0.1}Y_{0.2}O_x$ (BZPY) was prepared by combustion synthesis from a mixture of barium nitrate, zirconium nitrate, praseodymium nitrate, and yttrium nitrate at about 800° C. in air using glycine as a fuel. The phase purity of the BZPY powder was checked by x-ray diffraction. BZY and BCY can also be made using the combustion synthesis technique.

Example 2. Porous Substrate Synthesis

A porous BZY substrate was prepared from a powder mixture of about 100 grams of BZY (Praxair Specialty Ceramics) and about 11 grams of carbon lampblack (Fisher Scientific). The mixture was ball-milled in isopropyl alcohol (about 100 mL) using a zirconia medium (about 200 grams, about 5 mm particle size). After milling for about 12 hours, the isopropyl alcohol was evaporated, and the dried powder was uniaxially pressed into a disk. The disk was then partially sintered for about 4 hours at about 1100° C. in air to substantially remove the carbon by combustion and provide a porous BZY ceramic disk.

To prepare a porous NiO/BZY substrate, a powdered mixture of about 35 grams of BZY, about 65 grams of NiO, about 11 grams of carbon lampblack, and about 2 grams of binder (PVA) was ball-milled in isopropyl alcohol (about 100 mL) using zirconia medium (about 200 grams, about 5 mm particle size). After milling for about 12 hours, the isopropyl alcohol was evaporated, and then the resulting dried powder was sieved (200 mesh sieve size, equivalent to about 74 μm particle size). The sieved powder was uniaxially pressed into a disk and partially sintered for about 5 hours at about 950° C. in air.

Example 3. Electrolyte Film Fabrication

A thin film electrolyte was fabricated using a colloidal dip-coating process. The colloidal dip-coating process used colloids of BZY, BZPY, and BCY, which were prepared by dispersing about 2 to 4 g of BCY powder in 100 mL of isopropanol.

To fabricate the layered BCY-BZY film, the BZY film was first deposited by dipping the partially-sintered porous substrate into a BZY colloid (about 3 g BZY in 100 mL of isopropanol), and the dipped substrate was then dried to remove isopropanol. The dipping and drying steps were repeated to obtain the desired thickness (about 5 to 6 μm) of the BZY, after which the BZY-coated substrate was dipped into a BCY colloid (about 3 g BCY in 100 mL of isopropanol) to deposit a BCY coating on top of the BZY. The dipping and drying steps were repeated to obtain the desired thickness (about 5 to 6 µm) of the BCY. The resulting BZY/BCY-coated substrate was then dried and sintered in ambient air at temperature of 1400° C. for 5 hours using heating and cooling rates of 180° C./hour.

A layered BCY-BZPY film was made by a process similar to that used for the layered BCY-BZY film, substituting BZPY in place of the BZY. Sintering of the layered BCY-BZPY film was performed at 1350° C. for 10 hours in ambient air.

Figure 2:
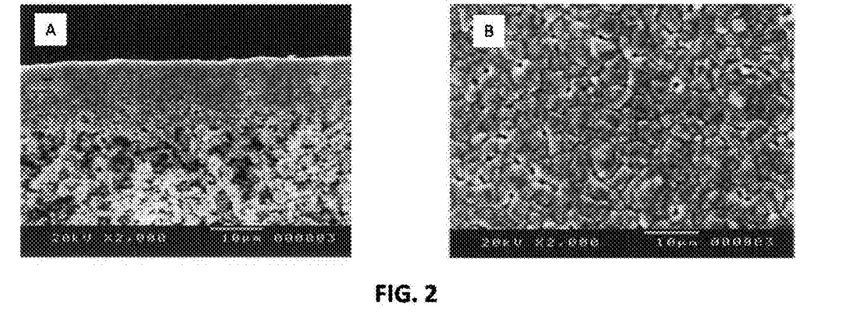
FIG. 2 provides scanning electron micrographs of a BCY/BZY composite film on a porous NiO/BZY substrate; Panel A shows a fracture image, and Panel B shows a surface image.

FIG. 2 shows scanning electron microscope ("SEM") micrographs of a BCY-BZY composite film sintered at 1400° C. for 5 hours in air. The film was prepared using the colloidal dip-coating process described above. To fabricate the composite film, a "green" (i.e., unsintered) BZY film was first made by dipping a porous NiO/BZY anode substrate into a BZY colloid. After removing the solvent from the resulting green BZY layer, the substrate was dipped into a BCY colloid to form a green BCY coating on top of the BZY. The green multi-layer film was then sintered to form dense BZY and BCY films. An SEM micrograph of the fracture surface (FIG. 2, Panel A) shows a composite film that is about 12 µm thick, with a dense BCY layer (about 6 µm thick) at the top of the film and a BZY layer (about 6 µm thick) with some isolated pores between the BCY layer and the porous anode substrate. The SEM micrograph of the BCY surface (FIG. 2, Panel B) verifies that the BCY is a dense film with relatively well-defined grain boundaries.

Figure 3:
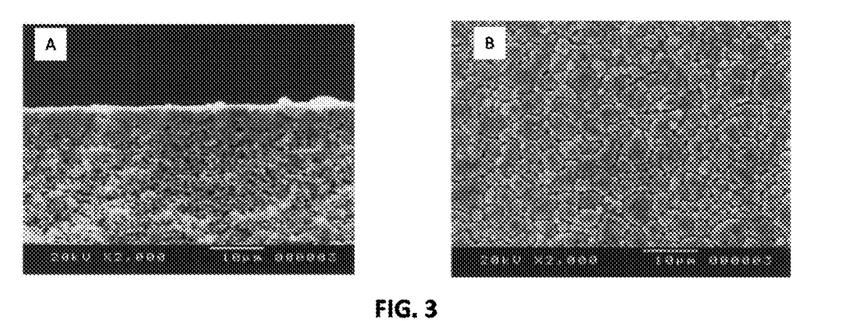
FIG. 3 provides scanning electron micrographs of a BCY/BZPY composite film on a porous BZY substrate; Panel A shows a fracture image, and Panel B shows a surface image.

FIG. 3 shows SEM micrographs of a BCY-BZPY composite film sintered at 1350° C. for 10 hours in air. The film was prepared using a conventional colloidal dip-coating process. To fabricate the composite film, a "green" (i.e., unsintered) BZPY film was first made by dipping a porous NiO/BZY substrate into a BZPY colloid. After removing the solvent from the resulting green BZPY layer, the substrate was dipped into a BCY colloid to form a green BCY coating on top of the BZY. The green multi-layer film was then sintered to form dense BZPY and BCY films. An SEM micrograph of the fracture surface (FIG. 3, Panel A) shows a composite film that is about 9 µm thick, with a dense BCY layer (about 5 µm thick) at the top of the film and a BZPY layer (about 4 µm thick) with some isolated pores between the BCY layer and the porous anode substrate. The SEM micrograph of the BCY surface (FIG. 3, Panel B) verifies that the BCY is a dense film with relatively well-defined grain boundaries.

Figure 4:
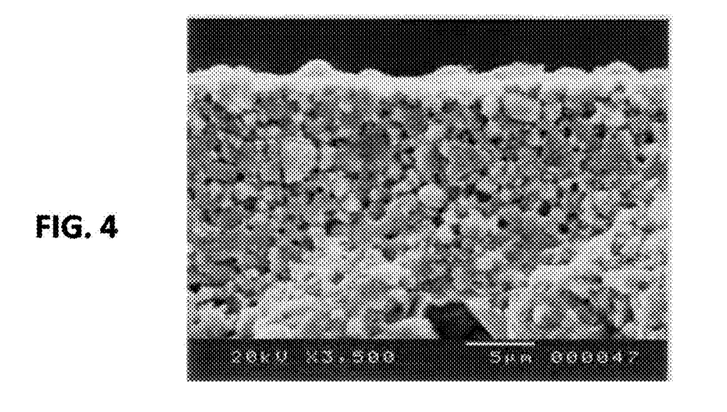
FIG. 4 provides a scanning electron micrograph of a BZY fracture film on a porous NiO/BZY substrate; the film was sintered at 1500° C. for 5 hours in air (compare to the dense BCY/BZY composite film that was sintered at 1400° C.
Figure 5:
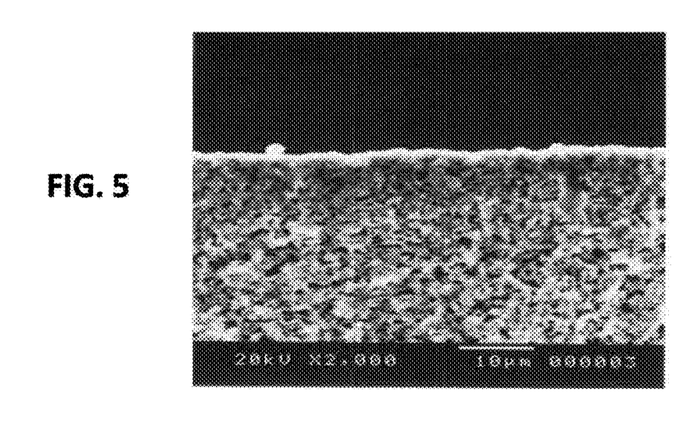
FIG. 5 provides a scanning electron micrograph of a BZPY fracture film on a porous BZY substrate; the film was sintered at 1350° C. for 5 hours in air. (compare to the dense BCY/BZPY composite film in FIG. 3).

For comparison, FIG. 4 provides a scanning electron micrograph of a BZY fracture film on a porous NiO/BZY substrate. The film was prepared as described above, but without the BCY coating steps, and then sintered at 1500° C. for 5 hours in air (compare to the dense BCY/BZY composite film that was sintered at 1400° C. in FIG. 2). FIG. 5 provides a scanning electron micrograph of a BZPY fracture film on a porous BZY substrate; The film was prepared as described above, but without the BCY coating steps, and then sintered at 1350° C. for 5 hours in air. (compare to the dense BCY/BZPY composite film in FIG. 3).

Example 4. Chemical Stability of BZY

The chemical stability of a BZY material ($BaZr_{0.8}Y_{0.2}O_3$) and two simulated interfacial BCZY materials ($BaCe_{0.7}Zr_{0.1}Y_{0.2}O_3$ and $BaCe_{0.5}Zr_{0.3}Y_{0.2}O_3$) toward prolonged exposure (100 hours at 500° C.) to a moist simulated shale gas (1% $CO_2$, 4% $C_3H_8$, 15% $C_2H_6$, 80% $CH_4$) were assessed by X-ray powder diffraction.

Figure 6A:
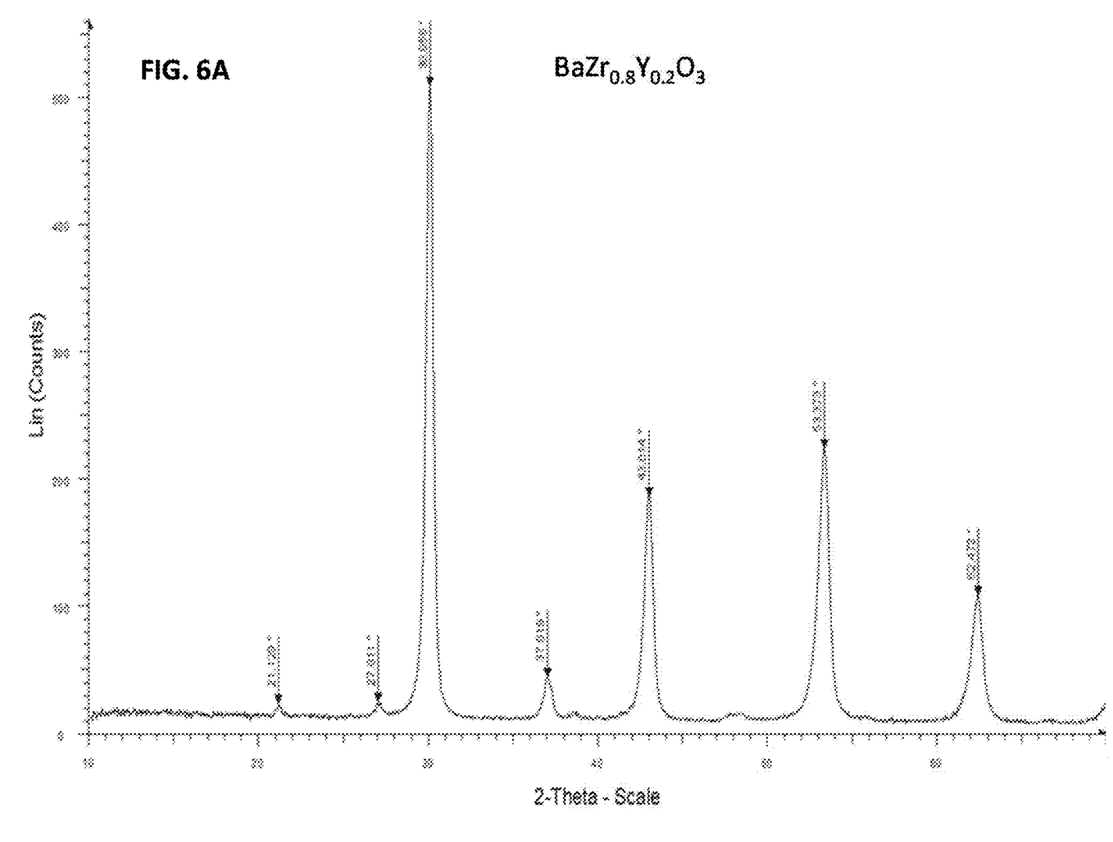
FIG. 6A provides an X-ray powder diffraction spectrum of $BaZr_{0.8}Y_{0.2}O_3$ (BZY).
Figure 6B:
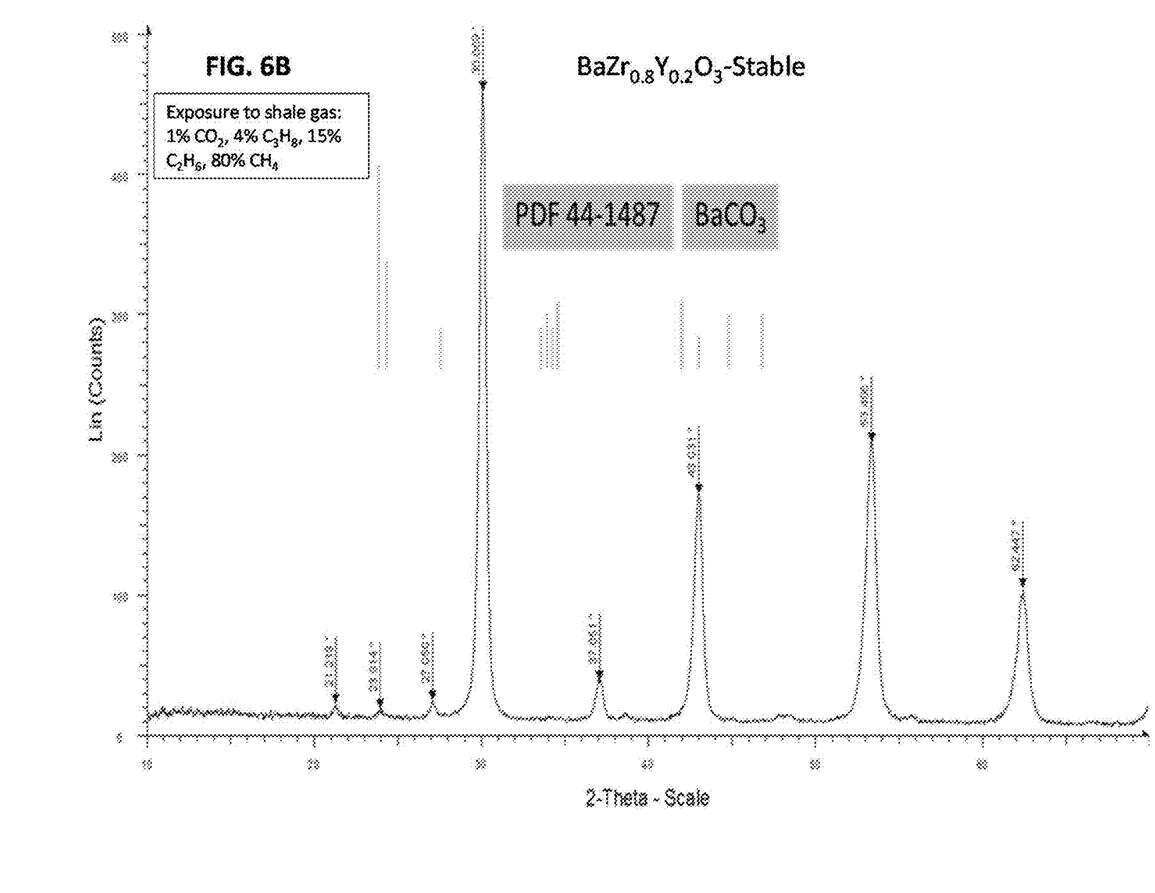
FIG. 6B provides an X-ray powder diffraction spectrum of $BaZr_{0.8}Y_{0.2}O_3$ (BZY) exposed to moist shale gas (1% $CO_2$, 4% $C_3H_8$, 15% $C_2H_6$, 80% $CH_4$) at 500° C. for about 100 hours.

FIG. 6A provides an X-ray powder diffraction spectrum of $BaZr_{0.8}Y_{0.2}O_3$ (BZY). FIG. 6B provides an X-ray powder diffraction spectrum of the $BaZr_{0.8}Y_{0.2}O_3$ (BZY) after expose to moist shale gas (1% $CO_2$, 4% $C_3H_8$, 15% $C_2H_6$, 80% $CH_4$) at 500° C. for about 100 hours. A comparison of FIG. 6A to FIG. 6B indicates that the $BaZr_{0.8}Y_{0.2}O_3$ was stable under these conditions, as evidenced by the close similarity of the two spectra and the near absence of peaks due to $BaCO_3$ in the gas-exposed material.

Figure 7A:
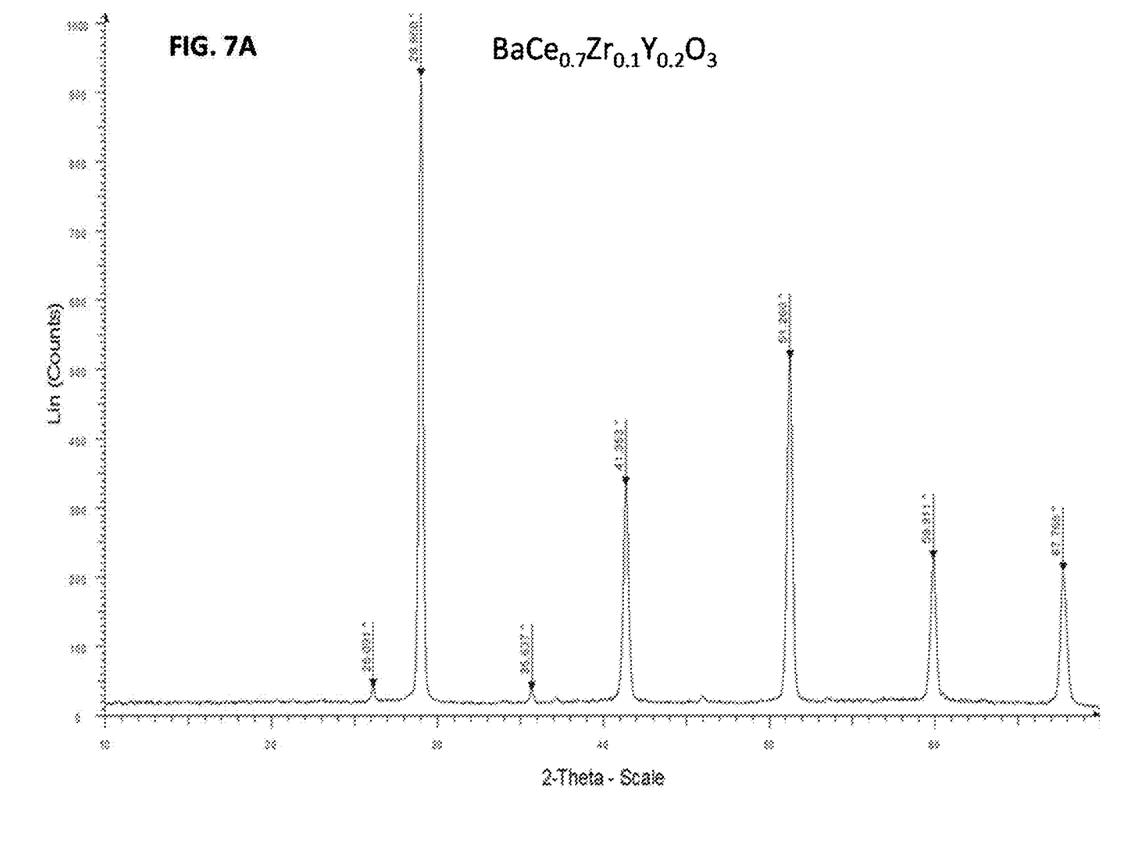
FIG. 7A provides an X-ray powder diffraction spectrum of $BaCe_{0.7}Zr_{0.7}Y_{0.2}O_3$ (BCZY-1).
Figure 7B:
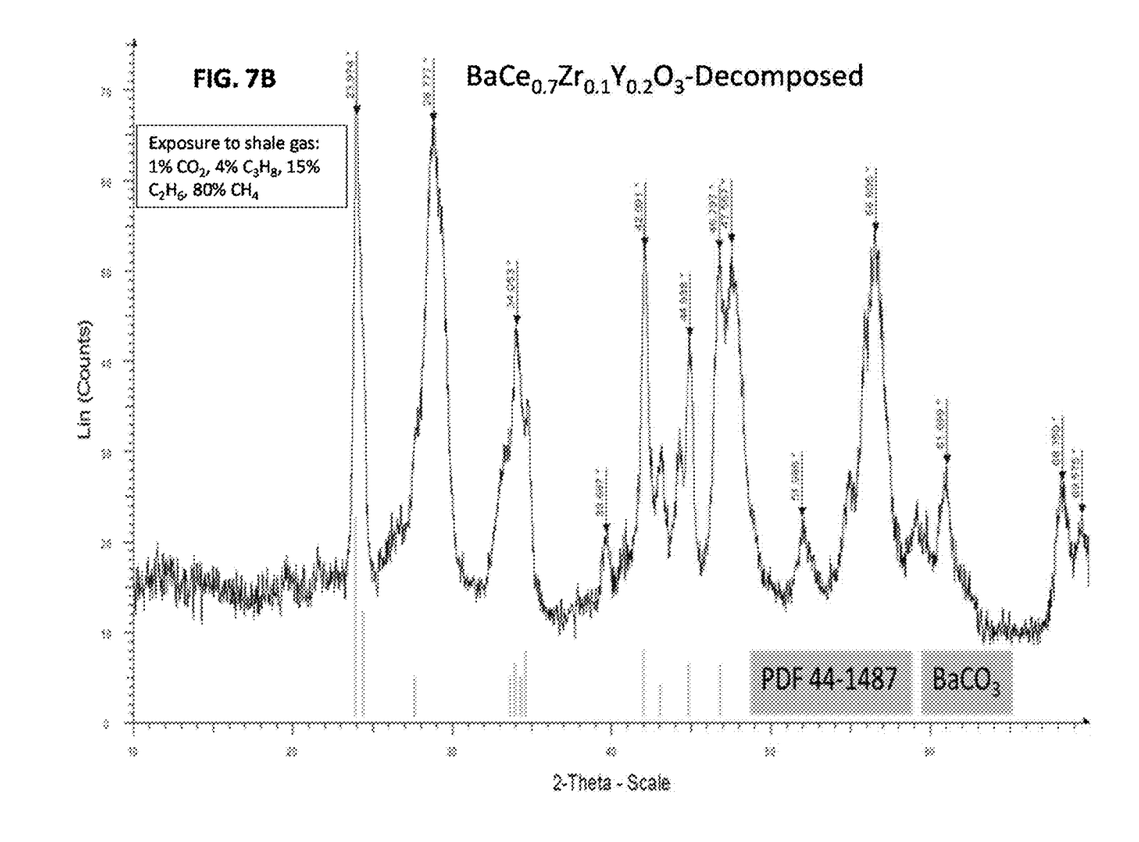
FIG. 7B provides an X-ray powder diffraction spectrum of BaCe$_{0.7}$Zr$_{0.7}$Y$_{0.2}$O$_3$ (BCZY-1) exposed to moist shale gas (1% CO$_2$, 4% C$_3$H$_8$, 15% C$_2$H$_6$, 80% CH$_4$) at 500° C. for about 100 hours.

FIG. 7A provides an X-ray powder diffraction spectrum of $BaCe_{0.7}Zr_{0.7}Y_{0.2}O_3$ (BCZY-1). FIG. 7B provides an X-ray powder diffraction spectrum of $BaCe_{0.7}Zr_{0.7}Y_{0.2}O_3$ exposed to moist shale gas (1% $CO_2$, 4% $C_3H_8$, 15% $C_2H_6$, 80% $CH_4$) at 500° C. for about 100 hours. A comparison of FIG. 7A to FIG. 7B indicates that the $BaCe_{0.7}Zr_{0.1}Y_{0.2}O_3$ decomposed under these conditions, as evidenced by the nearly complete loss of peaks due to BCZY and the appearance of peaks due to $BaCO_3$ in the gas-exposed material.

Figure 8A:
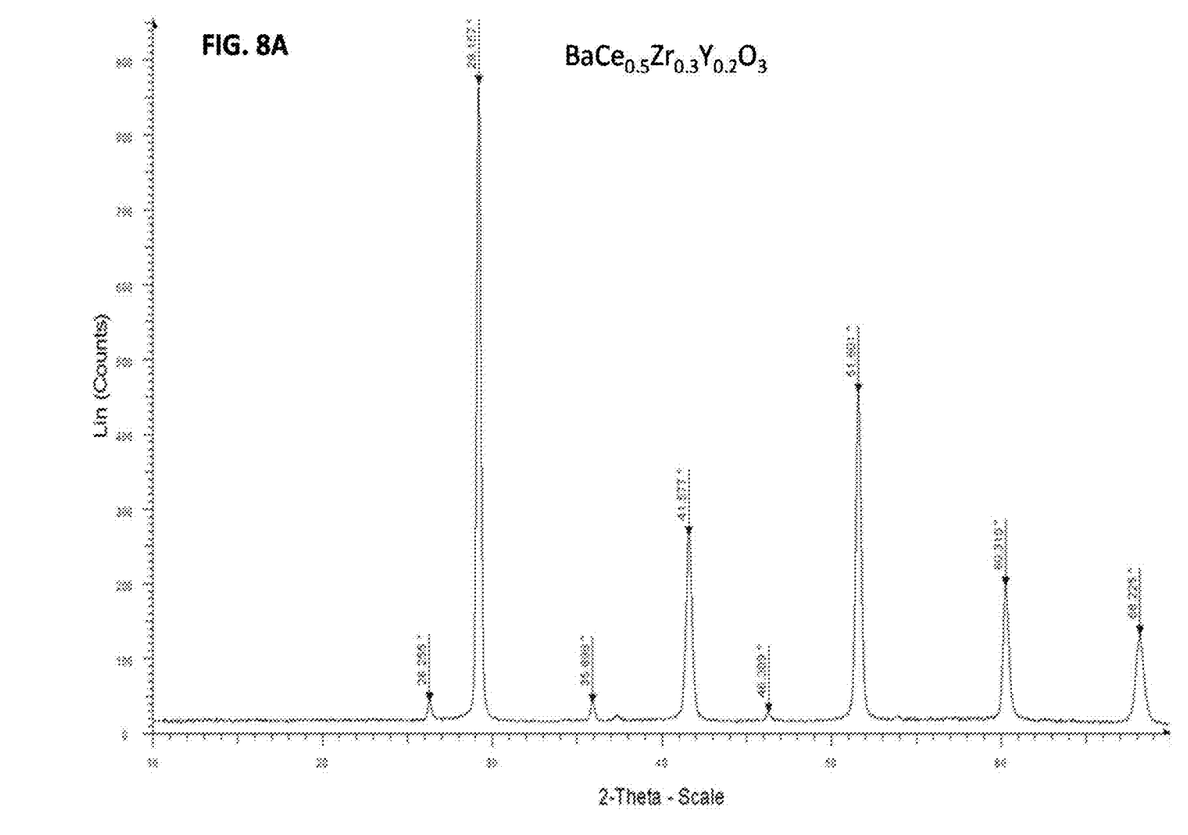
FIG. 8A provides an X-ray powder diffraction spectrum of BaCe$_{0.5}$Zr$_{0.3}$Y$_{0.2}$O$_3$ (BCZY-2).
Figure 8B:
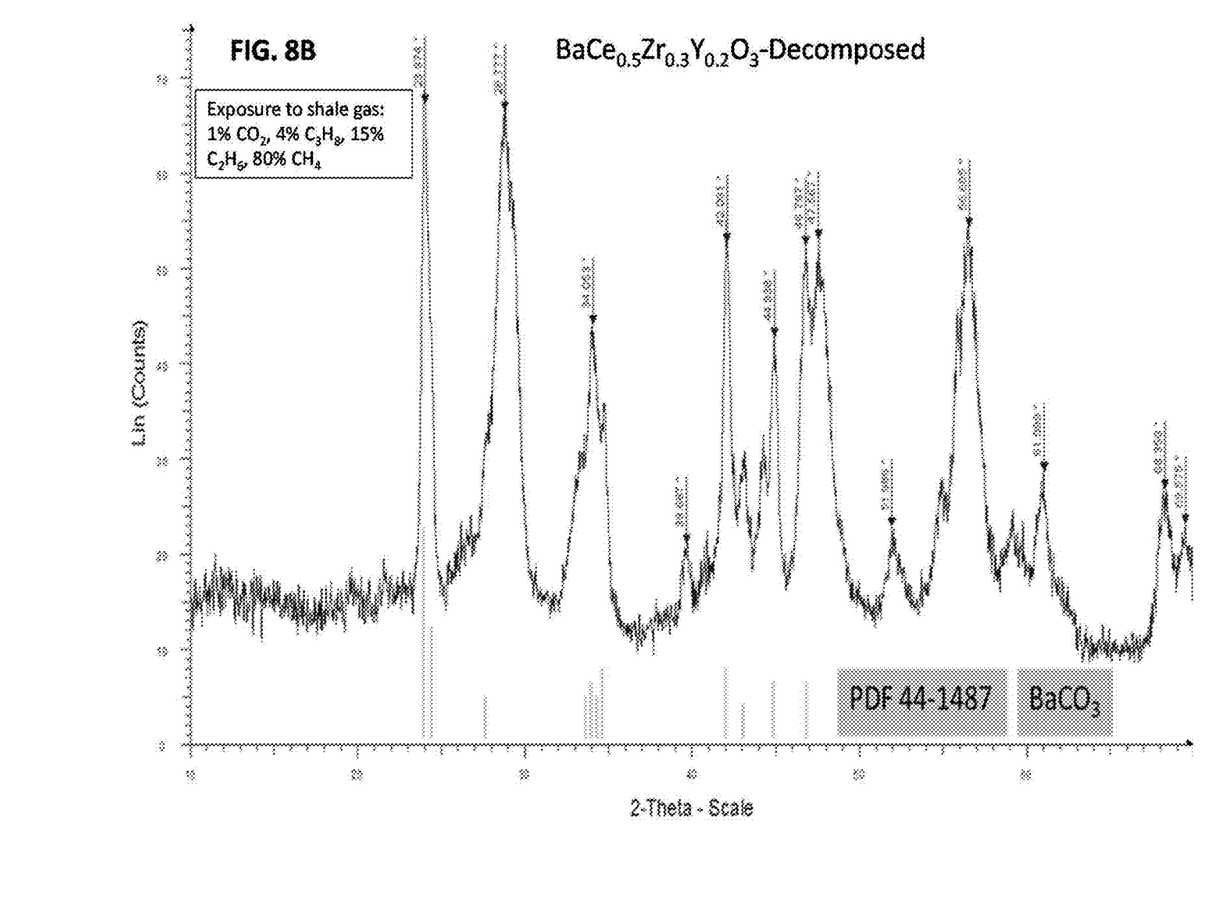
FIG. 8B provides an X-ray powder diffraction spectrum of BaCe$_{0.5}$Zr$_{0.3}$Y$_{0.2}$O$_3$ (BCZY-2) exposed to moist shale gas (1% CO$_2$, 4% C$_3$H$_8$, 15% C$_2$H$_6$, 80% CH$_4$) at 500° C. for about 100 hours.

FIG. 8A provides an X-ray powder diffraction spectrum of $BaCe_{0.5}Zr_{0.3}Y_{0.2}O_3$ (BCZY-2). FIG. 8B provides an X-ray powder diffraction spectrum of $BaCe_{0.5}Zr_{0.3}Y_{0.2}O_3$ exposed to moist shale gas (1% $CO_2$, 4% $C_3H_8$, 15% $C_2H_6$, 80% $CH_4$) at 500° C. for about 100 hours. A comparison of FIG. 8A to FIG. 8B indicates that the $BaCe_{0.5}Zr_{0.3}Y_{0.2}O_3$ decomposed under these conditions, as evidenced by the nearly complete loss of peaks due to BCZY and the appearance of peaks due to $BaCO_3$ in the gas-exposed material.

Based on this stability information, the presence of a stable dense layer of BZY on the anode side of the electrolyte appears to shield the interfacial layer and the BCY layer of the multilayered electrolytes described herein from exposure to the moist hydrocarbon gas while still allowing proton transport through the dense layers. FIGS. 7B and 8B show the decomposition i.e., instability of BCZY of two different compositions exposed to shale gas. FIG. 6B shows the stability of BZY exposed to shale gas. BCY layer is put on top of BZY layer. As you see in FIG. 6B, BZY is stable when exposed to shale gas and BZY layer prevents the BCY layer contacting/seeing shale gas during operation of fuel cell.

Example 5. Fuel Cell Evaluation

Figure 9:
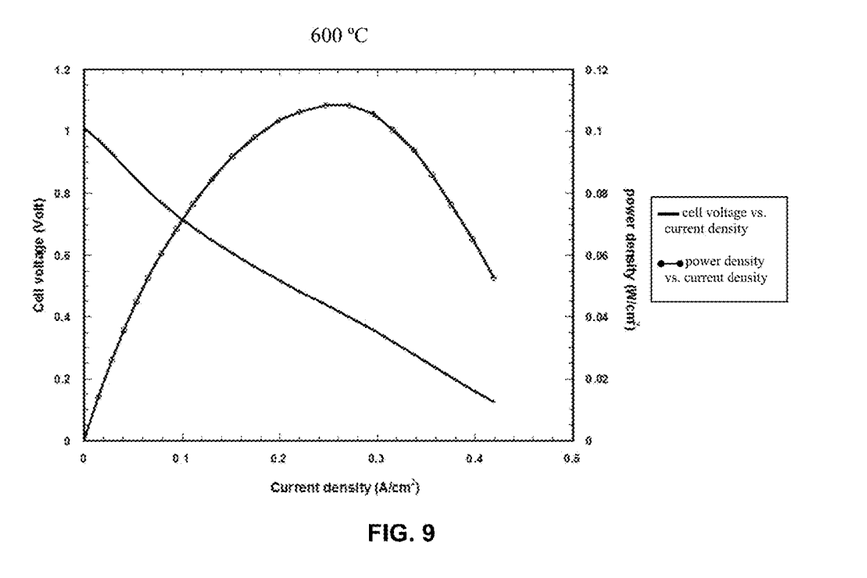
FIG. 9 provides cell voltage vs. current density plot (downward-sloped curve) and power density v. current density plot (parabolic-shaped curve) for a fuel cell as described herein.
Figure 10:
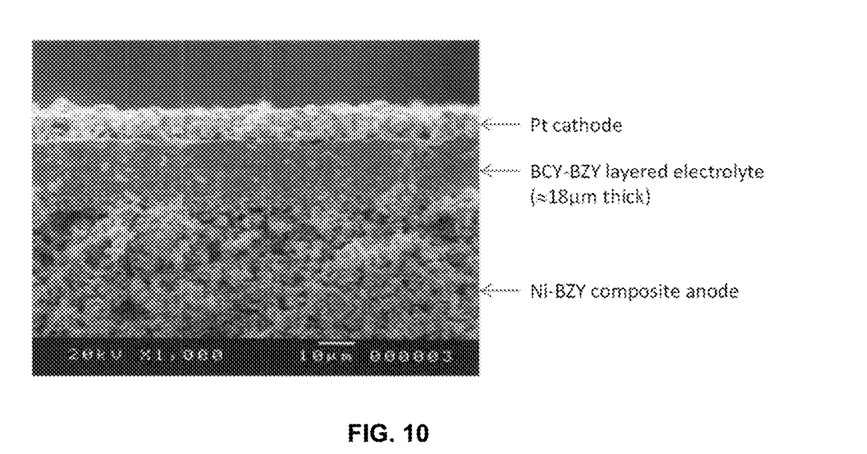
FIG. 10 provides a facture surface SEM image of the fuel cell referred to in FIG. 9, after fuel cell operation.

A fuel cell incorporating an anode electrolyte assembly comprising a BZY/BCY multilayer electrolyte (about 18 µm thick) on a porous BZY-Ni anode and a platinum cathode was evaluated at about 600° C. using hydrogen as fuel and air as oxidant gas. The cell voltage vs. current density plot (downward-sloped curve) and power density vs. current density plot (parabolic-shaped curve) for the cell are shown in FIG. 9, documenting the performance of the fuel cell. A maximum power density of 0.105 W/cm$^2$ was obtained at a current density of about 0.26 A/cm$^2$. The corresponding cell voltage for that current density was about 0.42 V. A cross-sectional fracture surface SEM photo of the fuel cell, after operation, is shown in FIG. 10, and shows that the electrolyte maintained its dense structure during operation of the cell.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The embodiments of the invention in which an exclusive property or privilege is claimed are defined as follows:

1. A multilayer anode/electrolyte assembly comprising a porous ceramic anode substrate comprising an electrically conductive material selected from a metal, a metal oxide, and combination thereof, dispersed in a porous ceramic matrix; and a layered solid electrolyte comprising:
   (a) a first dense layer having an inner surface and an outer surface, the first dense layer comprising yttrium-doped barium zirconate (BZY) and optionally, another metal ion besides barium, zirconium, and yttrium, wherein the inner surface of the first dense layer is in contact with a surface of the substrate;
   (b) a second dense layer comprising yttrium-doped barium cerate (BCY); and
   (c) an interfacial layer between and in contact with the outer surface of the first dense layer and a surface of the second dense layer, the interfacial layer comprising a solid solution of the BZY and the BCY;
   wherein the first dense layer and the interfacial layer prevent contact between the second dense layer and the porous anode substrate.

2. The multilayer anode/electrolyte assembly of claim 1, wherein the first dense layer comprises a praseodymium-containing yttrium-doped barium zirconate (BZPY).

3. The multilayer anode/electrolyte assembly of claim 1, wherein the electrically conductive material comprises Ni, NiO, or a combination thereof, which is dispersed in the porous ceramic matrix.

4. The multilayer anode/electrolyte assembly of claim 1, wherein the anode substrate comprises porous yttrium-doped barium zirconate with NiO dispersed therein (NiO-BZY).

5. The multilayer anode/electrolyte assembly of claim 1, wherein the first dense layer has a thickness in the range of about 0.1 micrometers ("µm") to about 20 µm.

6. The multilayer anode/electrolyte assembly of claim 1, wherein the second dense layer has a thickness in the range of about 0.1 µm to about 20 µm.

7. The multilayer anode/electrolyte assembly of claim 1, wherein the anode substrate has an average pore size in the range of about 0.2 µm to about 5 µm as determined by scanning electron microscopy ("SEM").

8. The multilayer anode/electrolyte assembly of claim 1, wherein the anode substrate has a porosity in the range of about 10% to about 40% as determined by SEM.

9. A multilayer anode/electrolyte assembly comprising a porous NiO-BZY anode substrate; and a layered solid electrolyte comprising:
   (a) a first dense layer having an inner surface and an outer surface, the first dense layer comprising yttrium-doped barium zirconate (BZY), wherein the inner surface of the first dense layer is in contact with a surface of the substrate;
   (b) a second dense layer comprising yttrium-doped barium cerate (BCY); and
   (c) an interfacial layer between and in contact with the outer surface of the first dense layer and a surface of the second dense layer, the interfacial layer comprising a solid solution of the BZY of the first dense layer and the BCY;
   wherein the first dense layer and the interfacial layer prevent direct contact between the second dense layer and the porous anode substrate.

10. The multilayer anode/electrolyte assembly of claim 9, wherein the first dense layer, second dense layer, and interfacial layer together have a combined thickness in the range of about 0.2 µm to about 40 µm.

11. The multilayer anode/electrolyte assembly of claim 9, wherein the first dense layer has a thickness in the range of about 0.1 µm to about 20 µm.

12. The multilayer anode/electrolyte assembly of claim 9, wherein the second dense layer has a thickness in the range of about 0.1 µm to about 20 µm.

13. The multilayer anode/electrolyte assembly of claim 9, wherein the substrate has an average pore size in the range of about 0.2 µm to about 5 µm as determined by SEM, and a porosity in the range of about 10% to about 40% as determined by SEM.

14. A multilayer anode/electrolyte assembly comprising a porous NiO-BZY anode substrate; and a layered solid electrolyte comprising:
   (a) a first dense layer having an inner surface and an outer surface, the first dense layer comprising praseodymium-containing yttrium-doped barium zirconate (BZPY), wherein the inner surface of the first dense layer is in contact with a surface of the substrate;
   (b) a second dense layer comprising yttrium-doped barium cerate (BCY); and
   (c) an interfacial layer between and in contact with the outer surface of the first dense layer and a surface of the second dense layer, the interfacial layer comprising a solid solution of the BZPY and the BCY; wherein the first dense layer and the interfacial layer prevent direct contact between the second dense layer and the porous anode substrate.

15. The multilayer anode/electrolyte assembly of claim 14, wherein the first dense layer, second dense layer, and interfacial layer together have a combined thickness in the range of about 0.2 µm to about 40 µm.

16. The multilayer anode/electrolyte assembly of claim 14, wherein the first dense layer has a thickness in the range of about 0.1 µm to about 20 µm.

17. The multilayer anode/electrolyte assembly of claim 14, wherein the second dense layer has a thickness in the range of about 0.1 µm to about 20 µm.

18. The multilayer anode/electrolyte assembly of claim 14, wherein the substrate layer has an average pore size in the range of about 0.2 μm to about 5 μm as determined by SEM, and a porosity in the range of about 10% to about 40% as determined by SEM.

19. A fuel cell comprising a porous cathode contacting the second dense layer of the multilayer anode/electrolyte assembly of claim 1, wherein gaseous fuel comprising hydrogen, a hydrocarbon, or a combination thereof contacts the porous anode substrate of the assembly, a gaseous oxygen source contacts the porous cathode, and the fuel cell is maintained at a temperature in the range of about 400 to 600° C.

20. The fuel cell of claim 19, wherein a majority of the gaseous fuel comprises hydrogen, methane or a combination thereof.

\* \* \* \* \*